United States Patent [19]

Korkosz

[11] 4,258,890

[45] Mar. 31, 1981

[54] TRIMMABLE FEEL SYSTEM FOR AIRCRAFT CONTROL

[75] Inventor: Gregory J. Korkosz, Malibu, Calif.

[73] Assignee: Summa Corporation, Las Vegas, Nev.

[21] Appl. No.: 921,203

[22] Filed: Jul. 3, 1978

[51] Int. Cl.³ .............................................. B64C 13/28
[52] U.S. Cl. ........................................ 244/223; 74/522
[58] Field of Search ............. 244/83 D, 223; 318/628; 188/163; 91/363 R; 74/522; 310/109, 169, 94; 303/61

[56] References Cited

U.S. PATENT DOCUMENTS

| | | | |
|---|---|---|---|
| 2,772,841 | 12/1956 | Bonsteel | 244/83 D |
| 2,923,503 | 2/1960 | Vogel | 244/83 D |
| 3,637,264 | 1/1972 | Leiber et al. | 303/61 X |
| 3,698,772 | 10/1972 | Nixon | 303/61 X |
| 3,929,380 | 12/1975 | Leiber | 303/61 X |

*Primary Examiner*—Barry L. Kelmachter

*Attorney, Agent, or Firm*—Smyth, Pavitt, Siegemund, Jones & Martella

[57] ABSTRACT

The system is used in power-assisted control systems to provide a restoring force to the control stick indicative to the pilot of the deflection of a control surface. The feel system is trimmable in that the neutral position can be altered. In prior systems trimming was accomplished by releasing a brake which permitted movement of a part of the control stick linkage toward an equilibrium position in response to the restoring force. In prior systems the released part acquired sufficient momentum to cause it to overshoot and oscillate about the equilibrium position. If the brake were engaged prematurely, the momentum was imparted to the control stick resulting in a disagreeable "kick" felt by the pilot. To overcome these problems, the brake is repetitively disengaged and engaged at a repetition rate in the range 5-40 Hz. The small amount of momentum built up in each of the successive cycles results in an almost imperceptible vibratory reaction on the control stick rather than a single large "kick". The trimming motion is damped, in effect, although no damper is employed.

5 Claims, 6 Drawing Figures

TRIMMABLE FEEL SYSTEM FOR AIRCRAFT CONTROL

BACKGROUND OF THE INVENTION

1. Field of the Invention

The present invention is in the field of aircraft control systems and more specifically relates to a trimmable feel system for use in conjunction with a power-assisted control system.

2. The Prior Art

Prior to the development of power-assisted control systems for aircraft, the pilot could gauge the amount of control he was applying by the amount of force required to maintain a particular deflection of an aerodynamic control surface. This force was felt by the pilot as he manipulated the control stick. The development of power-aided control presented a problem in that the reaction of the aerodynamic control surface was not transmitted to the pilot's control stick, the reaction forces being overcome by the powered actuators. In response to this problem artificial feel systems were developed so that a reaction force could be felt on the control stick by the pilot as he operated the controls.

The simplest artificial feel system conceivable would consist of a spring loaded mounting for the control stick, such that when the stick is moved from a preselected neutral position, a restoring force is developed in a direction tending to return the control stick to the neutral position.

Such a system is satisfactory when the average position of the control stick coincides with the predetermined neutral position. However, if the control stick has to be maintained for a long period of time at a position other than the predetermined neutral position, it becomes necessary for the pilot to exert a force on the control stick for an extended period of time simply to maintain a chosen setting of the control. The desirability soon became apparent of being able to reset the neutral position of the control stick to coincide with the position found to be used most of the time. The process of resetting the neutral position is known as trimming the feel system.

When the control stick is moved from its neutral position, a force is applied to the control stick linkage by the restoring springs. One prior art system employed a brake connecting the control stick with the portion of the linkage on by the restoring springs. The control stick was moved to a desired new position and then the brake was disengaged. The released portion of the linkage, impelled by the spring force, sped towards the equilibrium spring position, developing sufficient momentum to overshoot the desired position and to oscillate about the desired position until the oscillation died out. If the brake were engaged during this oscillatory phase, a startling and disagreeable transient force was applied to the pilot's control stick.

It was undesirable for the pilot to have to wait for the oscillation to die out before engaging the brake because of the time required. Another approach to the oscillation problem was to critically damp the oscillation. This latter approach required the use of a damper which added weight and complexity to the system.

The present invention overcomes the oscillation problem without the need for adding a damper.

SUMMARY OF THE INVENTION

In accordance with the present invention, the brake between the control stick linkage and the spring-mounted member is operated in a novel manner. The brake is repeatedly engaged and disengaged at a high rate of repetition. Because the brake never remains disengaged very long, only a limited amount of momentum can be built up in the spring-mounted portion, and even this limited amount of momentum is dissipated at the end of each cycle when the brake is engaged. The net result is that the spring-mounted portion returns to its equilibrium position with a motion which approximates that which would be obtained in a critically damped system, but without the need for a damper.

In a preferred embodiment of the present invention, the brake is an electrical brake actuated by a solenoid. The repetitive engaging and disengaging action of the brake is produced by applying to it a pulsed electric current in place of the steady current normally used.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
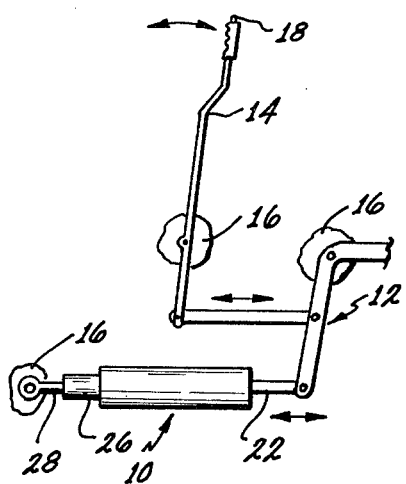
FIG. 1 is a diagram showing the control stick, the control stick linkage and the trimmable feel system of the present invention.

Turning now to the drawings, in which like parts are denoted by the same reference numeral throughout, there is shown in FIG. 1 a mechanical diagram showing the trimmable feel system 10 of the present invention and its mechanical relationship to the control stick 14. In a preferred embodiment of the invention, the trimmable feel system 10 is connected at one end to the airframe 16, and the other end of the trimmable feel system 10 is connected to the control linkage 12. That linkage is driven by the pilot through the control stick 14 which typically is pivotally mounted to the airframe 16, as is the control linkage 12. An electrical switch 18 is mounted on the control stick 14 for use by the pilot in controlling the trimming operation.

Figure 2:
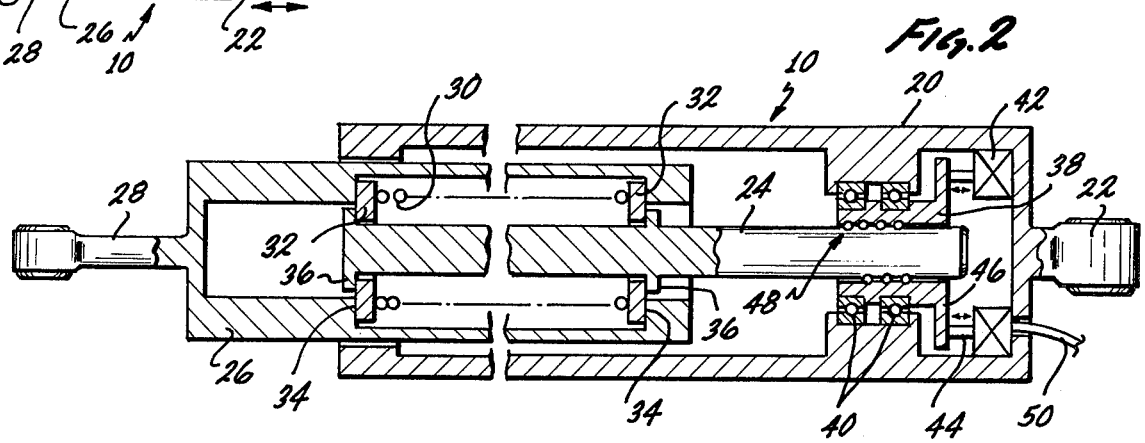
FIG. 2 is a cross-sectional view of the trimmable feel system in a preferred embodiment of the present invention.

FIG. 2 shows in greater detail the structure typically employed in trimmable feel systems including that of the present invention.

As shown in FIG. 2 in cross section, the trimmable feel system 10 includes a first member 20, in this embodiment the outer case of the device, which is connected by a mounting ring 22 at one end to the control stick 14 through the control linkage 12, so that movement of the control stick produces a corresponding simultaneous movement of the first member 20 relative to the airframe.

The trimmable feel system 10 further includes a second member 24, in the form of a bolt which is movable within the tubular member 26 which is attached to the airframe 16 by means of the attachment 28. Motion of the second member 24 axially with respect to the tubular element 26 is opposed in both directions by the compression spring 30 which is confined between the washers 32, urging them apart. Each of the washers 32 is restrained from moving in one direction by the edges 34 of the tubular element 26, but each washer 32 is pushed in the opposite direction by the projections 36 on the second member 24. In this manner, the compression spring 30 opposes motion of the second member 24 in both axial directions relative to the tubular element 26, i.e., relative to the airframe 16. FIG. 2 shows the second member 24 in its equilibrium position relative to the tubular element 26, and it can be seen that any movement from this position will tend to further compress the compression spring 30.

The means used in a preferred embodiment to selectively couple and decouple the first member 20 to and from the second member 24 will now be described. A nut 38 is mounted for rotation within the first member 20 by the ball bearings 40. The bearings permit rotational motion but also serve to prevent axial motion of the nut 38 with respect to the first member 20.

Rotation of the nut 38 with respect to the first member 20 is selectively controlled by selective application of an electric current to the solenoid 42 which controls the extension and retraction of the brake elements 44. The brake elements 44 thus selectively engage through friction contact the disc 46 portion of the nut 38 to control its rotation.

The second member 24 does not rotate. It engages the nut 39 through threads of steep pitch or, in a preferred embodiment, through a recirculating ball thread 48.

The operation of the trimmable feel system 10 is as follows. Normally, no current is applied to the solenoid 42, with the result that normally the brake element 44 frictionally engages the disc portion 46 of the nut 38 preventing rotation of the nut 38 relative to the first member 20 as well as relative to the second member 24. Thus, if the electric current should fail, the previous trim condition is maintained. When the pilot decides to trim the feel system to a new neutral position, he first moves the control stick 14 to the desired position. This produces an axial motion of the first member 20 which is communicated through the brake element 44 and the nut 38 to the second member 24, causing the compression spring 30 to be compressed. The compressed spring 30 exerts a reaction on the second member 24 tending to drive it in the direction opposite from which the pilot is pushing it.

At this point, the pilot actuates the electrical switch 18 which applies electrical current to the solenoid 42 retracting the brake elements 44 away from the disc portion 46 of the nut 38, thereby freeing the nut 38 for rotation. The force of the spring 30 now tends to thrust the second member 24 axially, which in turn, drives the nut 38 to rotate, because of the low friction of the recirculating ball thread 48. As the nut 38 rotates, the second member 24 moves axially with respect to the first member 20 toward the equilibrium position defined above. Typically after a second or two, the second member 24 has approximately reached the equilibrium position, and at that time the pilot opens the electrical switch 18 terminating the flow of electrical current to the solenoid 42, and this extends the brake elements 44 which then frictionally engage the disc portion 46 of the nut 38 to brake its rotation, and thereby to re-establish a positive coupling between the first member 20 and the second member 24.

Figure 3:
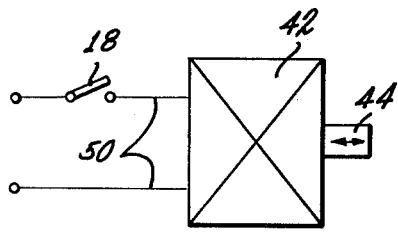
FIG. 3 is an electrical diagram of the trimmable feed system used in the prior art.
Figure 4:
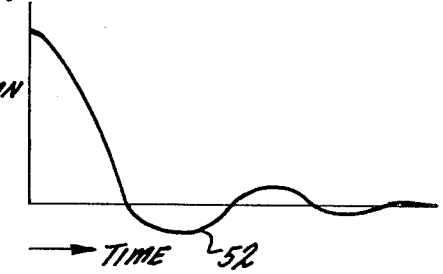
FIG. 4 is a graph showing the position of the nut portion of a prior art system versus time.

In the trimmable feel system of the prior art, illustrated in FIGS. 3 and 4, the application of electric current to the solenoid 42 by the closing of the electrical switch 18 by the pilot produces a single motion of the brake element, withdrawing it from contact with the disc portion 46. If the electrical switch 18 is held closed, the position of the nut 38 relative to the second member 24 typically follows the curve shown in FIG. 4. Initially, the spring force is stronger than it is later when the second member 24 approaches its equilibrium position, causing the second member 24 to gain momentum rapidly. This same momentum causes the second member to overshoot the equilibrium position as indicated by the portion 52 of the curve of FIG. 4. If the pilot opens the electrical switch 18 before the oscillation of the second member 24 has died out, the momentum of the second member 24 will be transferred to the first member 20, imparting an undesirable "kick" to the control stick 14.

One way of avoiding this "kick" is for the pilot to maintain the switch 18 closed until ythe oscillation has died out. The drawback with this approach being that the oscillation may persist for several seconds.

A second approach to eliminating the "kick" would be to provide damping means operative on the second member 24 to produce a critically damped oscillation. The damping would, of course, slow the motion of the second member 24, thereby tending to prolong the time required for trimming the feel system, and in addition, the provision of a damping member would add weight and complication to the device.

Figure 5:
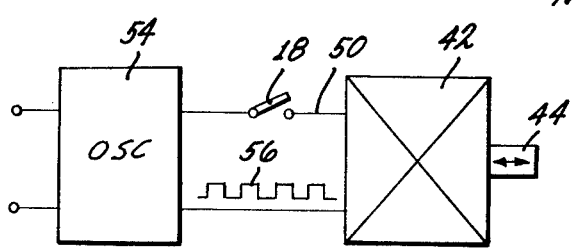
FIG. 5 is an electrical diagram of the trimmable feel system in a preferred embodiment of the present invention; and, FIG. 6 is a diagram showing the position versus time of the nut portion of the trimmable feel system according to the present invention.
Figure 6:
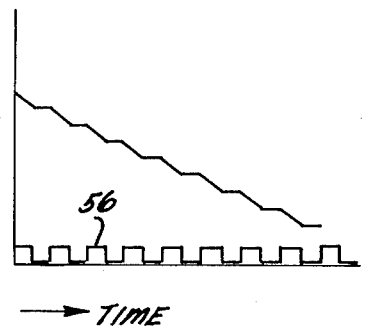

The present invention is based on the insight that a third alternative exists, as indicated in FIGS. 5 and 6.

In accordance with the present invention, an oscillator 54 produces an electrical current having a repetitive wave form 56, and this repetitive electical current is applied to the solenoid 42 upon closing of the electrical switch 18. While the electric current is flowing during each pulse of the wave form 56, the second member 24 is released for movement and takes a relatively small step toward its equilibrium position. During this step, the second member 24 builds up very little momentum, since the momentum acquired in each step equals the average force acting on the second member during the step multiplied by the duration in time of the step. At the end of each step, the first member again engages the second member through the action of the electrical brake, and a small amount of momentum is transferred to the control stick 14. This small amount of momentum is almost imperceptible to the pilot. Thus, in contrast to the prior art system described in connection with FIG. 4, in the present invention, the momentum of the second member 24 is dissipated in a series of imperceptible impulses rather than all at once in a large "kick". The trimmable feel system of the present invention does not exhibit the overshoot phenomenon described in connection with FIG. 4 above, and in that sense more nearly resembles a critically damped system.

It is important in connection with the present invention, that the repetition frequency of the repetitive electric current should be less than the maximum frequency at which the brake can respond. On the other hand, the repetition frequency should be sufficiently high that a reasonable number of repetitions occur during each trimming operation, so that the impulses felt by the pilot on the control stick will be of relatively high frequency and barely perceptible in magnitue. In one instance of application of the present invention, repetition frequencies between 5 Hz. and 40 Hz. were found to be optimum, and with these frequencies, equilibrium was reached in approximately one second.

The precise shape of the wave form 56 is not critical for the trimmable feel system of the present invention. Any type of oscillator 54 compatible with the electrical characteristics of the solenoid 42 can be used. If a source of alternating current of a suitable frequency is available, the repetitive current can be obtained by half-wave rectification.

It is recognized that the present invention can be used in vehicles other than aircraft and helicopters. The airframe is equivalent to the hull of a ship and to the chassis of a vehicle. The control stick is equivalent to the tiller of a boat or the steering wheel of a vehicle. The electric brake could, in principle, by powered by mechanical, pneumatic or hydraulic force.

Thus, there has been described a new and useful trimmable feel system which can be used advantageously in the control systems of aircraft, including helicopters. The invention has been illustrated and described by way of a preferred embodiment, but it will be understood that additional embodiments will be obvious to those skilled in the art. The embodiments described herein, together with those additional embodiments, are considered to be within the scope of the invention.

What is claimed is:

1. A trimmable feel system for use with an airframe-mounted control stick of a control system to apply a restoring force to the control stick when the control stick is moved relative to the airframe from a neutral position and to permit an operator to trim the control stick by selectively resetting the neutral position, comprising in combination:
    a first member mechanically connected to the control stick so that movement of the control stick produces a corresponding simultaneous movement of said first member relative to the airframe;
    a second member mounted on the airframe so that movement of said second member relative to the airframe from an equilibrium position is opposed by a restoring force urging said second member to return to the equilibrium position; and,
    electric brake means for mechanically engaging and disengaging said first member and said second member, and responsive to an applied repetitive electric current of repetition rate less than a predetermined repetition rate to repetitively engage and disengage said first member and said second member at a rate equal to said repetition rate to damp the motion of said second member with respect to said first member, said repetitive electric current being selectively applied by the operator to trim the control stick, said electric brake means operative in the absence of said applied repetitive electric current to positively couple the movement of said second member with the movement of said first member.

2. The trimmable feel system of claim 1 further comprising:
    generator means for generating said repetitive electric current;
    electric switch means electrically connected to said generator means and to said electric brake means for applying under control of the operator said repetitive electric current generated by said generator means to said electric brake means.

3. In a trimmable feel system of the type which applies a restoring force to an airframe-mounted control stick when the control stick is moved relative to the airframe from a neutral position and of the type which permits an operator to trim the control stick by selectively resetting the neutral position, and of the type which includes a first member mechanically connected to the control stick so that movement of the control stick produces a corresponding simultaneous movement of the first member relative to the airframe, and which further includes a second member mounted on the airframe so that its movement relative to the airframe from an equilibrium position is opposed by a restoring force urging the second member to return to the equilibrium position, the improvement comprising:
    an electric brake for mechanically engaging and disengaging the first and second members, responsive to an applied repetitive electric current of repetition rate less than a predetermined repetition rate to repetitively engage and disengage the first member and the second member at a rate equal to said repetition rate to damp the motion of said second member with respect to said first member, the repetitive electric current being selectively applied by the operator to trim the control stick, the electric brake operative in the absence of said applied repetitive electric current to positively couple the movement of the second member with the movement of the first member.

4. A method of operating a trimmable feel system of the type which applies a restoring force to an airframe-mounted control stick when the control stick is moved relative to the airframe from a neutral position and of the type which permits an operator to trim the control stick by selectively resetting the neutral position, and of the type which includes a first member mechanically connected to the control stick so that movement of the control stick produces a corresponding simultaneous movement of the first member relative to the airframe, and which further includes a second member mounted on the airframe so that its movement relative to the airframe from an equilibrium position is opposed by a restoring force urging the second member to return to the equilibrium position, and which also includes an electric brake for mechanically engaging and disengaging the first and second members, responsive to an applied electric current to disengage the first member from the second member, the electric current being selectively applied by the operator to trim the control stick, the electric brake operative in the absence of said applied electric current to positively couple the movement of the second member with the movement of the first member, the method comprising the step of:

applying the electric current to the electric brake in the form of a sequence of repetitive current pulses of predetermined repetition rate to repetitively disengage the first member from the second member at the predetermined repetition rate to damp the motion of said second member with respect to said first member.

5. The method of claim 4 wherein said predetermined repetition rate is sufficiently slow to permit the electric brake to respond to each current pulse in the sequence by disengaging the first member from the second member.

* * * * *